Figure 1:
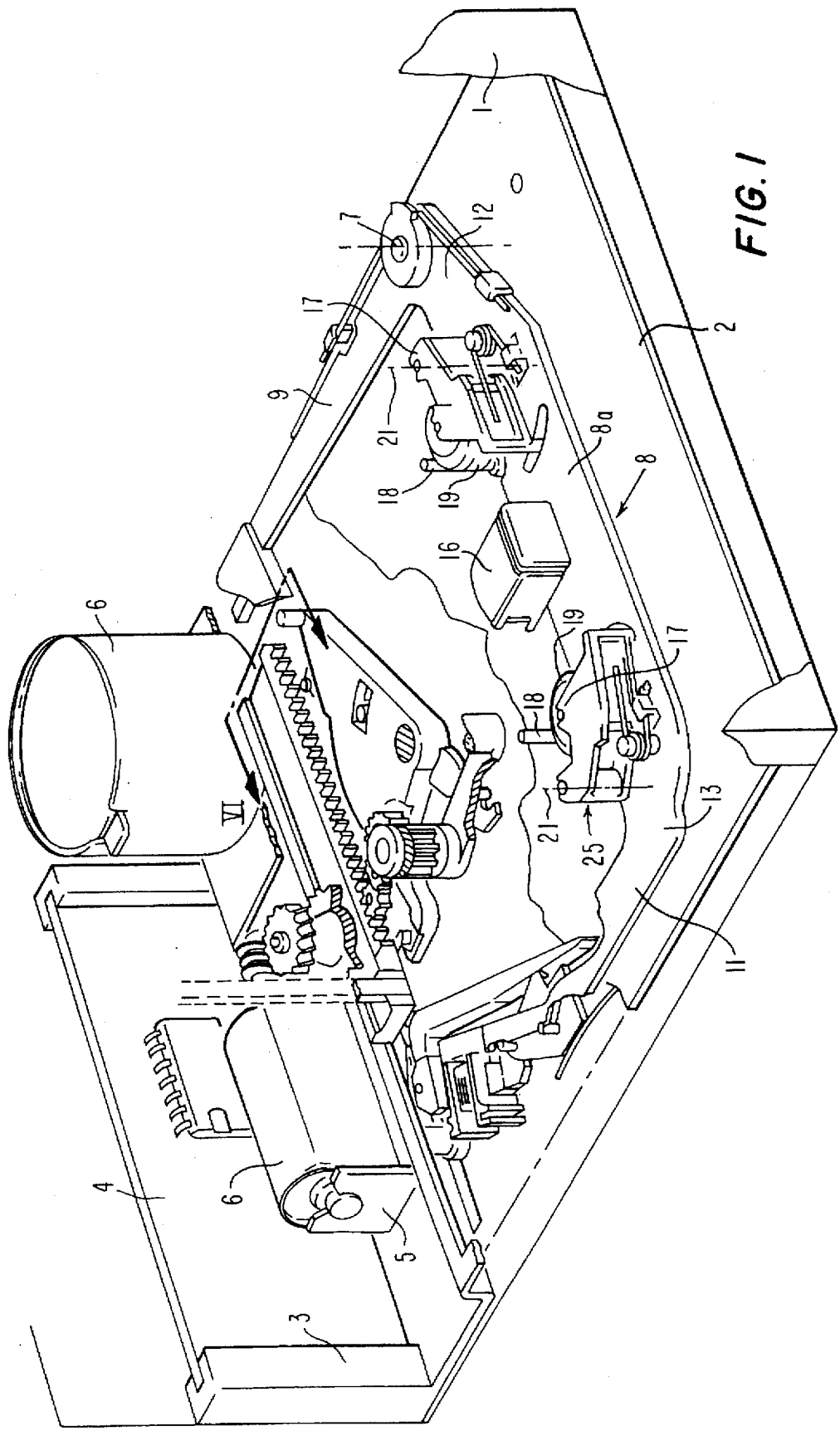

United States Patent [19]

Kämmler et al.

[11] Patent Number: 5,716,575
[45] Date of Patent: Feb. 10, 1998

[54] METHOD OF PRODUCING A MOVABLE PLASTIC PART ON A METAL PLATE

[75] Inventors: Georg Kämmler, Berlin; Stefan Müller, Wetzlar, both of Germany

[73] Assignee: U.S. Philips Corporation, New York, N.Y.

[21] Appl. No.: 710,623

[22] Filed: Sep. 20, 1996

Related U.S. Application Data

[62] Division of Ser. No. 329,572, Oct. 26, 1994, Pat. No. 5,575,433.

[30] Foreign Application Priority Data

Nov. 19, 1993 [DE] Germany .......................... 43 39 450.7

[51] Int. Cl.⁶ .................................................. B29C 45/14
[52] U.S. Cl. ................................. 264/242; 264/264
[58] Field of Search .................................. 264/242, 264

[56] References Cited

U.S. PATENT DOCUMENTS

| | | | |
|---|---|---|---|
| 3,591,669 | 7/1971 | Membry | 264/242 |
| 5,535,958 | 7/1996 | Kämmler et al. | 264/242 |
| 5,596,805 | 1/1997 | Kunze et al. | 264/242 |

*Primary Examiner*—Jan H. Silbaugh
*Assistant Examiner*—Edmund H. Lee
*Attorney, Agent, or Firm*—Robert M. McDermott

[57] ABSTRACT

A method for outsert molding a movable plastic part on a metal plate, wherein the movability is obtained automatically through the shrinkage of the plastic. The plastic part consists of a bridge element which traverses a hole in the metal plate and is integrally connected to opposing retaining elements by a film element. The size, shape, and rigidity of the film, bridge, and retaining elements are such that the forces produced during the shrinkage process lift the retaining elements off the metal plate.

8 Claims, 4 Drawing Sheets

METHOD OF PRODUCING A MOVABLE PLASTIC PART ON A METAL PLATE

This is a division of application Ser. No. 08/329,572, filed Oct. 26, 1994, now U.S. Pat. No. 5,575,433.

The invention relates to a technical device, particularly an electromechanical deck for moving information carriers, the device comprising at least one plastic part formed on a metal plate, which part has been moulded onto the metal plate by outsert-moulding and comprises at least one bridge element, which traverses a hole in the metal plate, and retaining elements, which are situated on the metal-plate surfaces and are interconnected by the bridge element.

Technical devices comprising metal supporting plates having moulded-on plastic parts are known. The technique of manufacturing such supporting plates is known as of outsert-moulding. The plastic parts formed on the supporting plate serve a wide variety of purposes, such as retaining, supporting or guiding further plastic parts. The technique of joining the moulded-on plastic parts and the supporting plate always consists in moulding around a hole in the metal plate in such a manner that plastic retaining elements formed on either side of the hole in the plate are interconnected by a plastic bridge element traversing the hole. The length reduction of the bridge element as a result of the inevitable shrinkage of the plastic after moulding causes the retaining elements to be drawn towards the two plate surfaces from both sides. This results in a comparatively tight fit which merely allows a rotation into a desired position but which is not comparable to a bearing construction whose parts in operation continuously perform a movement, for example a rotation or translation.

From DE 39 11 746 C2 (PHD 89-053) it known to provide a movability similar to that of a rotary or sliding bearing by deformation of the moulded-on material after the moulding process.

From JP 57-197139 A it is know to interpose between the mould cavity for a retaining element of the above kind and the associated plate surface a spacer which should be held in position very accurately and reliably during the moulding process. After the moulding process this spacer is removed, thereby providing the movability for the moulded-on part. Insertion, retention and subsequent removal of the spacer render the process too laborious for mass production.

It is an object of the invention to construct plastic parts formed on a base plate in a deck of a technical device during moulding by means of an outsert-moulding technique in such a way that these parts have the rotation or translation capability required in operation with an adequate strength of the retaining elements and without a subsequent process step being required.

According to the invention this object is achieved in that the movability of the plastic part as a slidable or rotatable part is obtained automatically through shrinkage of the plastic by means of the following construction:

a) the bridge element and the retaining elements are formed as tubular elements, b) the tubular retaining elements surround the edges of the hole with a clearance over the entire circumference, c) the bridge element and the retaining elements are connected at the peripheral location of the hole by means of an imperforate or perforate plastic film, d) the plastic film exhibits an orientation in the film plane at least at one of the metal-plate surfaces, e) the material cross-section of the tubular retaining elements in the area and the material cross-section of the tubular bridge element in the area are dimensioned in such a manner that the tubular retaining elements and the tubular bridge element are subject to a shrinkage such that it compensates for the tendency of the tubular elements to be shrunk onto the metal plate by warping of the plastic film caused by said shrinkage.

In a further embodiment of the invention this effect can be obtained in that the plastic film bulges as a result of the radially inward shrinkage of the tubular elements in the film plane, or in that in the case of a funnel shape of the plastic film a radially inward shrinkage of at least one of the tubular elements causes the parts of the plastic film which adjoin the tubular element to be radially pressed against one another in such a manner that the rise of the funnel-shaped portion has the effect of an extension of the tubular bridge element, the funnel-shaped portion of the plastic film, in the area where it is adjoined by the tubular bridge element, being supported by means of a diaphragm bridging the funnel and the hole in the tubular bridge element.

When the plastic part is thus formed during the moulding process it will have such a movability after shrinkage that it is freely movable during operation of the device. The principle used here is that a plastic shrinks after moulding, the shrinkage being dependent on the respective geometry, i.e. being controllable by means of the respective wall thickness or volume. This fact is utilised in order to achieve that three different bodies, i.e. two tubular retaining elements and one tubular bridge element, shrink differently, in such a manner that a film formed from the plastic material and joining a tubular retaining element and a tubular bridge element bulges. This is based on the recognition of the fact that the more strongly shrinking tubular retaining elements act in such a way on film bridges, or in general films joining the two, that they are upset and are thus forced to deflect by bulging or flexure. In this way the moulded part in the hole and on the base plate is loosened. The part is then freely movable.

In a further embodiment of the invention the film thickness of the plastic film is not greater than 0.5 mm.

In a further embodiment of the invention the cross-section of the tubular bridge element should be such that the tubular bridge element can reliably transmit moments from one side to the other side and a correct filling of the mould cavity is guaranteed.

In a further embodiment of the invention the shrinkage of the tubular bridge element is smaller than the shrinkage of the tubular retaining elements.

To manufacture a freely movable plastic part on the base plate of a technical device a method is used, which is characterised in that the plastic is injected into the mould in such a manner that the plastic flows through the film chamber(s) between the tubular bridge element and the tubular retaining elements in a directed flow with a higher flow velocity obtained as a result of the small cross-section. Owing to the smaller cross-section of the film chamber this directed flow has a higher velocity, which is obtained as a result of the nozzle-effect. The material in the film chamber is oriented accordingly and has a higher rigidity in accordance with the state of orientation.

In a variant of the method in accordance with the invention the material of the plastic film, which is made smaller than 0.5 mm at only one surface of the metal plate, flows through the film chamber as a directed flow from the tubular bridge element, and in that the plastic is pressed into the chamber, situated adjacent the film chamber, for the adjoining tubular retaining elements. In this way the location of the seam between different plastic flows in the mould is transferred substantially to the area of the tubular retaining elements.

In another variant of the method in accordance with the invention the chamber for the tubular retaining element, which chamber is filled via the film chamber, is additionally filled from an additional gating point. particularly in this variant it is advantageous if the seams resulting from plastic material flowing together from different directions are not formed, or only to a minimal extent, in the film areas.

In all the embodiments care is to be taken that the tubular retaining elements and the tubular bridge elements are dimensioned in such a manner that their configurations acquired during moulding are preserved, i.e. their distortion is minimal.

Figure 2:
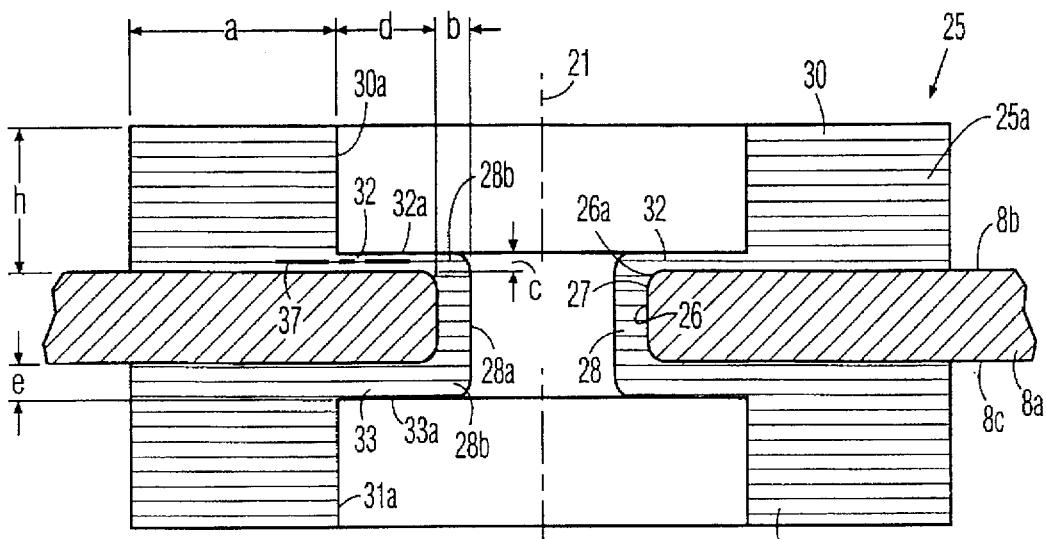
Figure 3:
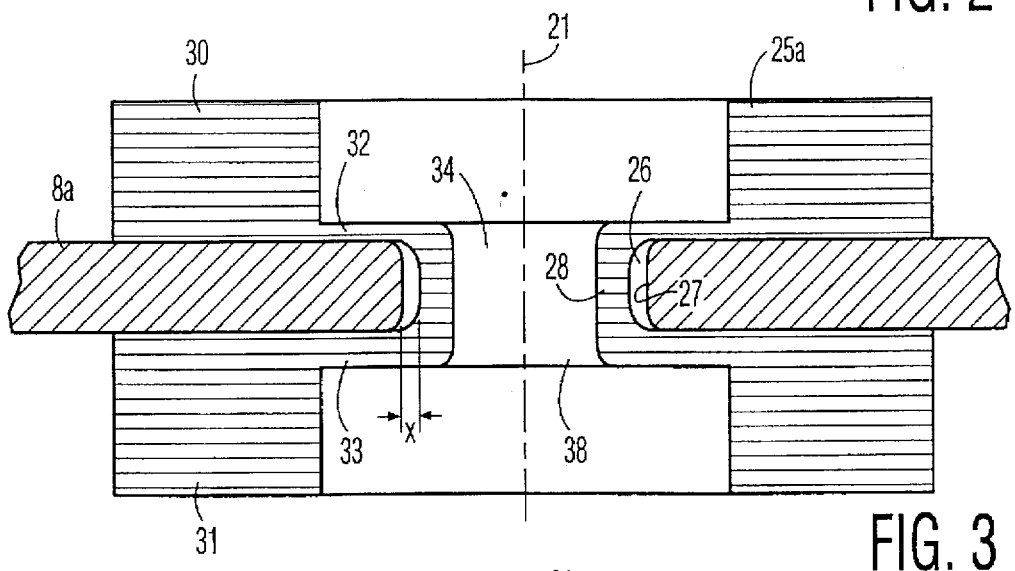
Figure 4:
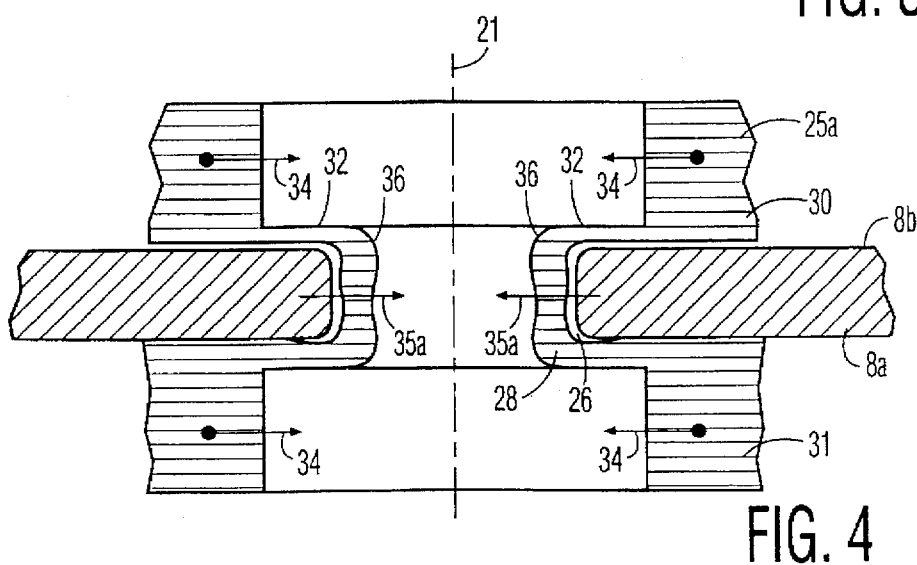
Figure 5:
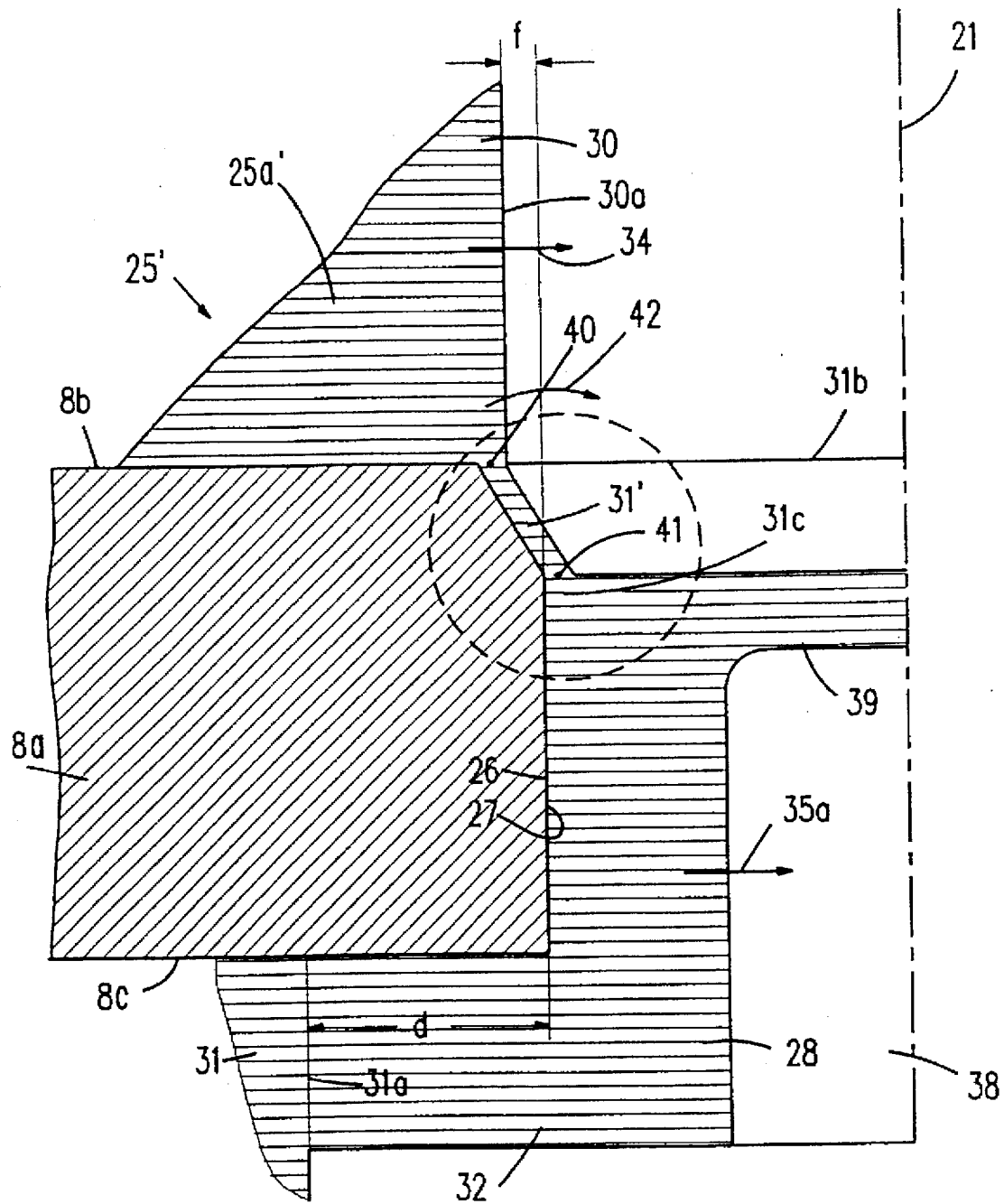
Figure 6:
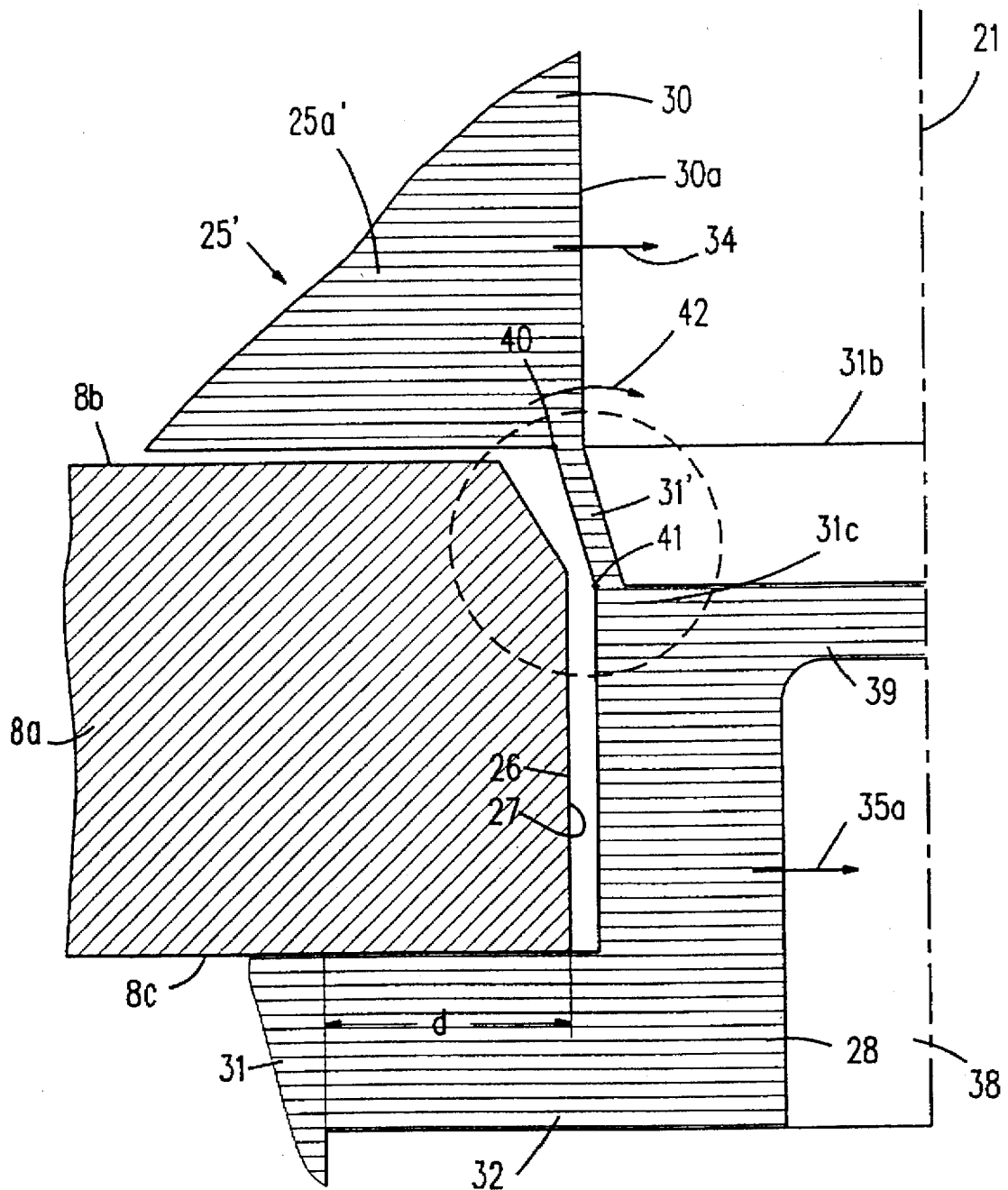

The invention will be described in greater detail with reference to the drawings, in which:

FIG. 1 is diagrammatic cut-away view of a technical device, in particular a car radio having a deck for information carriers in tape form, FIG. 2 is a sectional view of a metal plate with a plastic part moulded on by outsert-moulding, which fits tightly on the metal plate prior to shrinkage at the beginning of the post-compression stage, FIG. 3 is a sectional view similar to FIG. 2 before demoulding, when post-compression has ceased, FIG. 4 shows the metal plate with the moulded-on plastic part at room temperature after demoulding, FIG. 5 is an enlarged-scale sectional view showing the metal plate with a moulded-on plastic part of another construction during the moulding process prior to demoulding, only one half being shown, FIG. 6 shows the plastic part of FIG. 5 after demoulding.

FIG. 1 shows the base plate 2 of a magnetic-tape-cassette deck in a device, for example a car radio, onto which plastic parts 3 and 5, for example for supporting a circuit board 4 and mounting a motor 6, are mounted by outsert-moulding. The synthetic material used for this is preferably a semi-crystalline thermoplastic whose shrinkage without loading material is of the order of magnitude of 1% to 3%. A head plate 8 having limbs 9 and 11 at its corner areas 12 and 13 is pivotable about an axis 7. The head plate 8 is formed on a metal plate 8a and carries a magnetic head 16 and pressure rollers 19 cooperating with capstans 18 via supports 17.

The supports 17 are mounted on the head plate 8 so as to be pivotable about axes 21. The construction used for this purpose is described comprehensively with reference to FIGS. 2 to 4.

FIG. 2 is a sectional view showing a rotary bearing 25 of the support 17 with the axis 21. The stationary part of the bearing is constituted by the metal plate 8a which is formed with a hole 26. The rotatable part of the bearing 25 is formed by an injection-moulded plastic part 25a. The hole 26 of the metal plate 8a is circular and has an inner wall 27. The metal plate 8a has undergone such an outsert-moulding process that a tubular bridge element 28 of the plastic part 25a traverses the hole 26. The plastic part 25a is in a moulding condition corresponding to the beginning of the post-compression stage. This means that at this instant all the mould cavities are filled completely. Tubular retaining elements 30 and 31 are formed on the plate surfaces 8b and 8c. The clearance d between the inner walls 30a, 31a of the tubular retaining elements 30 and the inner wall 27 of the hole 26 has shifted outwardly over the entire circumference. The tubular retaining elements 30 and 31 are formed as solid tubular elements having a radial dimension a and an axial height h. The inner walls 30a and 31a of the tubular retaining elements are connected to the tubular bridge element 28 by integral plastic film bridges 32 and 33 formed as webs or continuous films in the same moulding operation. In the embodiment shown in FIGS. 2 to 4 the width e of the film bridges 33 of the tubular retaining element 31 in axial cross-section is distinctly greater than that of the film bridges 32 of the tubular retaining element 30 in the axial cross-section c. Both the edges 26a of the hole 26 in the metal plate 8 and the outer edges of the plastic film bridges 32 and 33 are rounded.

The cross-section or volume of the tubular bridge element 28 should be such that the element 28 can reliably transmit moments from one side to the other side and a correct filling of the mould cavity is guaranteed.

The pressure on the plastic should be directed uniformly in such a manner that the plastic part is not canted. This is dictated by the ratio between the radial cross-section a of the tubular retaining elements 30, 31 and the height h of the tubular retaining elements 30, 31.

The situation shown in FIG. 2 corresponds to the condition in the post-compression stage of the production process in which the plastic part 25 is present in a mould into which a plastic has been injected.

Injection-moulding of the plastic part 25a of the rotary bearing 25 is effected from gating points such that the plastic is injected into the mould, not shown, and is pressed into mould cavities, not shown, for the tubular retaining elements 30 and 31, the tubular bridge element 28 and the film portions 32 and 33 in the film plane 37. The mould is dimensioned in such a way that the plastic flows through the film chamber or chambers (cavities) between the tubular bridge element 28 and the tubular retaining elements 30, 31 in a directed flow with a higher flow velocity. The higher flow velocity is obtained in that the cross-sectional dimensions c and e of the film chambers are made so small that a nozzle effect is produced, which orients the plastic at the location of the film chambers. As a result of this orientation the film portions 32 and 33 formed in the film chambers are distinctly more rigid and are subject to a smaller shrinkage.

Although it is inevitable that seams are formed at the location of the film chambers the configuration and location of the gating point should be such that the flow in the film chambers is radially directed, as far as possible, so as to minimise the formation of seams. If the very thin webs or films should be formed only on the plate surface 8b this is preferably effected in that the plastic flows from the tubular retaining element 31 to the tubular retaining element 30 via the tubular bridge element 28 and the film chamber(s) (not shown) and propagates there in the chamber 30. Since the chamber of the tubular retaining element 30 has a large volume gating points may be provided not only on the tubular retaining element 31 but also on the tubular retaining element 30.

FIG. 3 illustrates the condition of the plastic part 25 before demoulding. post-compression has ceased.

The part loses volume due to crystallisation because the molecules are then packed more densely. This leads to radial contraction and the gap x can then be formed.

In the condition illustrated in FIG. 4 the mould has been removed and the plastic part has cooled to room temperature. At this instant the tubular retaining elements 30 and 31 have contracted by shrinkage in the directions indicated by the arrows 34. The tubular bridge element 28 has contracted in the directions indicated by the arrow 35a owing to mould shrinkage. As the shrinkage of the tubular retaining elements 30 and 31 owing to the large shrinking volume in the direction indicated by the arrows 34 is larger than the shrinkage of the tubular bridge element 28 in the direction indicated by the arrows 35a and the very small shrinkage of the film portions 32 have been urged towards the axis 21 and bulge distinctly at the bulging points 36. This results in the tubular retaining element being lifted off the surface 8b of the metal plate, thereby providing freedom of movement for the plastic part. The tubular bridge element 28 has come clear of the hole 26 owing to its shrinkage in the directions indicated by the arrows 35.

The principle can be applied not only to rotary bearings as shown in FIGS. 2 to 4 but also to sliding bearings. A sliding bearing construction only differs from a rotary bearing construction in that in the sliding bearing construction the tubular retaining elements 30 and 31 as well as the tubular bridge element 28 are rectangular and the axis 21 now becomes a mid-plane.

FIG. 5 shows a plastic part of another construction during the moulding process.

The rotary bearing 25' having an axis 21 again comprises the metal plate 8a with a hole 26 as its stationary party. The movable party of the bearing 25' is an injection-moulded plastic part 25a'. The hole 26 is circular in the case of a rotary bearing 25' but it may also take the form of a slot. It has an inner wall 27. In an outsert-moulding process a plastic is moulded around the metal plate 8a in such a way that a tubular bridge element 28 of the plastic part 25a' extends through the hole 26. Tubular retaining elements 30 and 31 are formed on the plate surfaces 8b and 8c. The clearance f between the inner wall 30a of the tubular retaining element 30 and the inner wall 27 of the hole 26 has shifted radially outwards over the entire circumference. The inner wall 31a has a clearance d relative to the inner wall 27 of the hole 26. The inner wall 31a of the tubular retaining element 31 and of the tubular bridge element 28 are connected by integral plastic film bridges 32 formed as webs or continuous films in the same moulding operation. In the example shown in FIG. 5 the plastic film bridge 31' is funnel-shaped. The funnel edge 31b of larger diameter is connected to the tubular retaining element 30 and the funnel edge 31c of smaller diameter is connected to the tubular bridge element 28. In the transitional area 31c with the small-diameter funnel edge 31c the hole 38 is bridged by a diaphragm 39, which closes the hole 38. The diaphragm is stiffened by molecular orientation of the plastic material. The moulding technique corresponds to the technique used for the function part shown in FIGS. 2 to 4.

FIG. 5 illustrates in an enlarged-scale view the principle of automatic separation of the function part 25a' from the metal plate. The diameter of the tubular retaining element 30 tends to decrease in the direction indicated by the arrow 34 as a result of shrinkage. Likewise the diameter of the tubular bridge element 28 tends to decrease. However, by selection of the volume the shrinkage of the tubular retaining element 30 is dimensioned so as to be larger than that of the tubular bridge element 28. Viewed in cross-section this results in transitions 40, 41 on the upper funnel edge 31b and the lower funnel edge 31c of the funnel-shaped plastic film bridge. An arrow 42 indicates that the upper funnel edge 31b is pressed further towards the axis 21 than the lower funnel edge 31c. Thus, in theory the funnel wall is pivoted about the transitions 41 along a circular path. This causes the tubular retaining element 30 to be lifted off the plate surface 8b. Since the diameter of the tubular bridge element 28 has also decreased as a result of shrinkage the tight fit of the plastic part 25a' on the metal plate 8a changes into a rotatable mounting, giving the function part the capability of a movable bearing part. In the same way as in the other example levers 43 or the like may be connected to the plastic part.

FIG. 6 shows the change in shape after the function part 25a' after removal and final shrinkage has become detached from the metal plate so as to be freely movable.

We claim:

1. A method of injection-moulding a movable plastic part formed on a metal plate by outsert-moulding, wherein the metal plate has a hole wall defining a hole in said plate, and said plastic part comprises at least one bridge element which extends through said hole, and retaining elements situated on either side of the metal plate and integral with the bridge element, comprising the steps of:

providing a mould to form the plastic part, said mould being shaped so that:

the bridge and retaining elements are tubular, the tubular retaining elements having a portion extending radially past the hole wall about the entire circumference of the hole, and, the bridge element and each retaining element are connected by respective plastic film elements, and said mould having a film chamber to form at least one of said plastic film elements adjacent to the hole wall, having an orientation in the film plane substantially along a surface of the metal plate, and having a small cross section relative to the wall thickness of the tubular bridge element and the tubular retaining elements, said mould having one or more gates for injection of plastic into said mould;

injecting plastic into the mould in such a manner that the plastic flows through the film chamber between the tubular bridge element and the tubular retaining elements in a directed flow;

removing the plastic from the mould, thereby allowing for thermal shrinkage, said mould having been formed so that the tubular retaining elements and the tubular bridge element are subject to shrinkage forces which result in a deformation of said at least one of said plastic film elements, and said deformation is a warping of said at least one of said plastic film elements so as to lift the tubular retaining elements away from said metal plate, thereby obtaining movability of the plastic part as a slidable or rotatable part through the shrinkage of the plastic.

2. A method as claimed in claim 1, wherein:

the step of injecting is carried out such that the plastic is pressed into the film chamber in a directed flow from the tubular bridge element to the tubular retaining elements.

3. A method as claimed in claim 2, wherein:

the tubular retaining elements is additionally filled from another gate.

4. A method as claimed in claim 1, wherein:

the cross-section of the film is made smaller than 0.5 mm at one surface of the metal plate.

5. A method as claimed in claim 1, wherein:

the shrinkage of the tubular bridge element is less than the shrinkage of the tubular retaining elements.

6. A method as claimed in claim 1, wherein:

the gates are located so that the plastic material flowing together from different directions does not form a substantial seam in the film elements.

7. A method as claimed in claim 2, wherein:

the gates are located so that the plastic material flowing together from different directions does not form a substantial seam in the film elements.

8. A method as claimed in claim 13, wherein:

the gates are located so that the plastic material flowing together from different directions does not form a substantial seam in the film element.

* * * * *